United States Patent
Gustafsson et al.

(10) Patent No.: US 7,672,676 B2
(45) Date of Patent: Mar. 2, 2010

(54) METHOD AND SYSTEM FOR POSITIONING IN A MOBILE COMMUNICATIONS NETWORK

(75) Inventors: Stefan Gustafsson, Karlskrona (SE); Corina Grahm, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/538,046

(22) PCT Filed: Dec. 11, 2002

(86) PCT No.: PCT/SE02/02308

§ 371 (c)(1), (2), (4) Date: Aug. 26, 2005

(87) PCT Pub. No.: WO2004/057905

PCT Pub. Date: Jul. 8, 2004

(65) Prior Publication Data

US 2006/0099958 A1 May 11, 2006

(51) Int. Cl.
H04W 24/00 (2009.01)
(52) U.S. Cl. ............... 455/456.1; 455/404.2; 455/432.2
(58) Field of Classification Search ............... 455/404.1, 455/404.2, 456.1–457, 435.1, 435.2, 432.1, 455/432.2, 433, 436, 466; 370/466, 467
See application file for complete search history.

(56) References Cited

U.S. PATENT DOCUMENTS

| | | | |
|---|---|---|---|
| 6,002,931 A * | 12/1999 | Yamaguchi et al. ......... 455/433 |
| 6,088,594 A * | 7/2000 | Kingdon et al. ............ 455/457 |
| 6,125,122 A * | 9/2000 | Favichia et al. ............ 370/466 |
| 6,151,498 A | 11/2000 | Roel-Ng et al. | |
| 6,411,632 B2 * | 6/2002 | Lindgren et al. ............ 370/466 |
| 2001/0003093 A1 | 6/2001 | Lundin | |
| 2004/0138807 A1 * | 7/2004 | Jha et al. ..................... 701/200 |
| 2004/0198397 A1 * | 10/2004 | Weiss ...................... 455/456.5 |
| 2005/0014500 A1 * | 1/2005 | Muhonen et al. ........... 455/433 |
| 2005/0243840 A1 * | 11/2005 | Sivalingam et al. ......... 370/401 |

FOREIGN PATENT DOCUMENTS

| WO | 99/46948 | 9/1999 |
|---|---|---|
| WO | 03/039187 A1 | 5/2003 |

OTHER PUBLICATIONS

International Search Report of PCT/SE02/02308, mailed Jun. 30, 2003.
Chinese Official Action dated Sep. 7, 2007.

* cited by examiner

*Primary Examiner*—Patrick N Edouard
*Assistant Examiner*—Anthony S Addy
(74) *Attorney, Agent, or Firm*—Nixon & Vanderhye P.C.

(57) ABSTRACT

A method and system for obtaining the position of a mobile station located in a current network of a communications system including a plurality of networks supporting different positioning protocols. The current network is identified at a location center based on the identified current network. A suitable positioning protocol is selected among at least two protocols for communication of location information with the current network.

10 Claims, 2 Drawing Sheets

METHOD AND SYSTEM FOR POSITIONING IN A MOBILE COMMUNICATIONS NETWORK

This application is the US national phase of international application PCT/SE2002/002308 filed 11 Dec. 2002 which designated the U.S. The entire content of this application is incorporated herein by reference.

TECHNICAL FIELD OF THE INVENTION

The present invention relates to a method and system for obtaining the position of a mobile station in a communications system, and more particularly to a method and system for a location service to obtain the position of a mobile station when located in a current network, wherein a home network, an originating network or said current network may use different mechanisms/protocols for positioning signalling between said networks.

BACKGROUND

Positioning is the process of geographically locating Mobile Stations (MS) in a Public Land Mobile Network (PLMN) by collecting and analyzing needed information, and after calculating the position, reporting it to an application for further usage.

Location-based services are forecasted to be an important feature in mobile communications network. A system for mobile positioning enables an operator to provide location-based services to its customers. Location information is an important enabler for many of the new services in the third generation mobile networks. Also, in some countries there are legal requirements on providing location information when an emergency call is made from an MS.

An ETSI standardised Gateway Mobile Location Centre (GMLC) discloses an example of a vital part of a mobile positioning system. The GMLC is the link between the PLMN and location services clients (LCS-C). It receives the positioning requests, performs the necessary authentication, initiates the positioning in the PLMN, and sends back the positioning information to the requesting application.

The knowledge of the location of a mobile entity opens up a new set of applications and enhances existing ones. A number of different applications in different fields, such as governmental, operators or commercial applications are and will be provided.

Each target group has its own demands and needs concerning location based services. Governmental use would typically be applicable for public welfare such as emergency calls and infrastructure planning. Operators have the ability for more accurate network planning by applying location information of large groups of mobile users. Commercial applications open up a whole new set of services.

Depending on the type of application it can be run either by an operator or a service provider. The operator is able to offer service providers access to location information, and the operator can also run its own applications. Existing services can be greatly enhanced and new services can be developed, with the knowledge of the geographical position of a mobile entity. The GMLC and a Serving Mobile Location Centre (SMLC)—which collects position information form the communications network and calculates the co-ordinates to be used by the application allows authorized applications, provided by the operator or third parties, to locate an MS using a variety of methods.

One important aspect of positioning is the support for location services (LCS) when mobile subscribers are roaming, i.e when a mobile subscriber is able to travel freely between cells while engaged in a single phone call, and international roaming, which means that the user can use the option of taking its phone abroad and using it in a Visited Public Land Mobile Network (VPLMN).

Another important aspect is that some applications, for example "friend-finder"-like applications, may need to obtain the position of MSs which are subscribers of other PLMNs.

Different PLMNs may support different location and roaming location mechanisms/protocols.

One such roaming location mechanism/protocol, known in the art, is used when the target MS is not located in its home PLMN (HPLMN) and SS7 signalling is used between the HPLMN and a VPLMN. In this mechanism the GMLC of the requesting LCS-C first interrogates the HLR (Home Location Register) in the home PLMN of the target MS for positioning routing information, i.e the current MSC/VLR (Mobile Switching Centre/Visitor Location Register) address of the MS. Then, this MSC/VLR is interrogated for positioning information. The MSC/VLR address can be located in any PLMN provided that it supports the same SS7 positioning roaming mechanism and that an SS7 roaming agreement exists.

Another approach for a roaming location mechanism/protocol is to use the Internet Protocol (IP). In this mechanism the GMLC of the LCS-C first interrogates the GMLC in the home PLMN of the target MS for positioning routing information, i.e in the PLMN where the MS is currently located. Then, the GMLC of this current PLMN is interrogated for positioning information. The MS can be located in any PLMN provided that it supports the same IP positioning roaming mechanism.

In addition to the above described methods, there also exist proprietary roaming support mechanisms and new proprietary solutions can be anticipated to evolve over time due to the consolidation of the number of PLMN operators.

Thus, there will probably exist various mechanisms/protocols and different operators and vendors will support these in various degrees. Further, when a positioning request is initiated it is not known which mechanisms will be needed during the course of the location procedure, since this will depend on in which PLMN the target MS is currently located, and the capabilities of that PLMN.

These state of the art solutions require that all PLMNs involved when positioning an MS must be able to support the same positioning roaming mechanism/protocol.

As set out above, it is anticipated that this will not be the case. Therefore, it is apparent that interoperability will be seriously jeopardized.

Also, it is anticipated that initiated but not successful positioning requests will create excess traffic load and thereby jeopardize system performance.

SUMMARY

It is an object to mitigate the above described drawbacks by providing a method for a location service requested from an originating network to obtain the position of a mobile station when located in a current network, wherein said originating network and current network use different positioning mechanisms/protocols. The current network of the mobile station is identified, and a suitable positioning protocol is selected based on the identified current network.

A protocol controller is configured to apply positioning protocols for different communication networks for usage in communication with the networks. A processing component is configured to identify the mobile station's current network, and based on the identified current network, select among said positioning protocols a suitable positioning protocol for communication with the current network.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION

Figure 1:
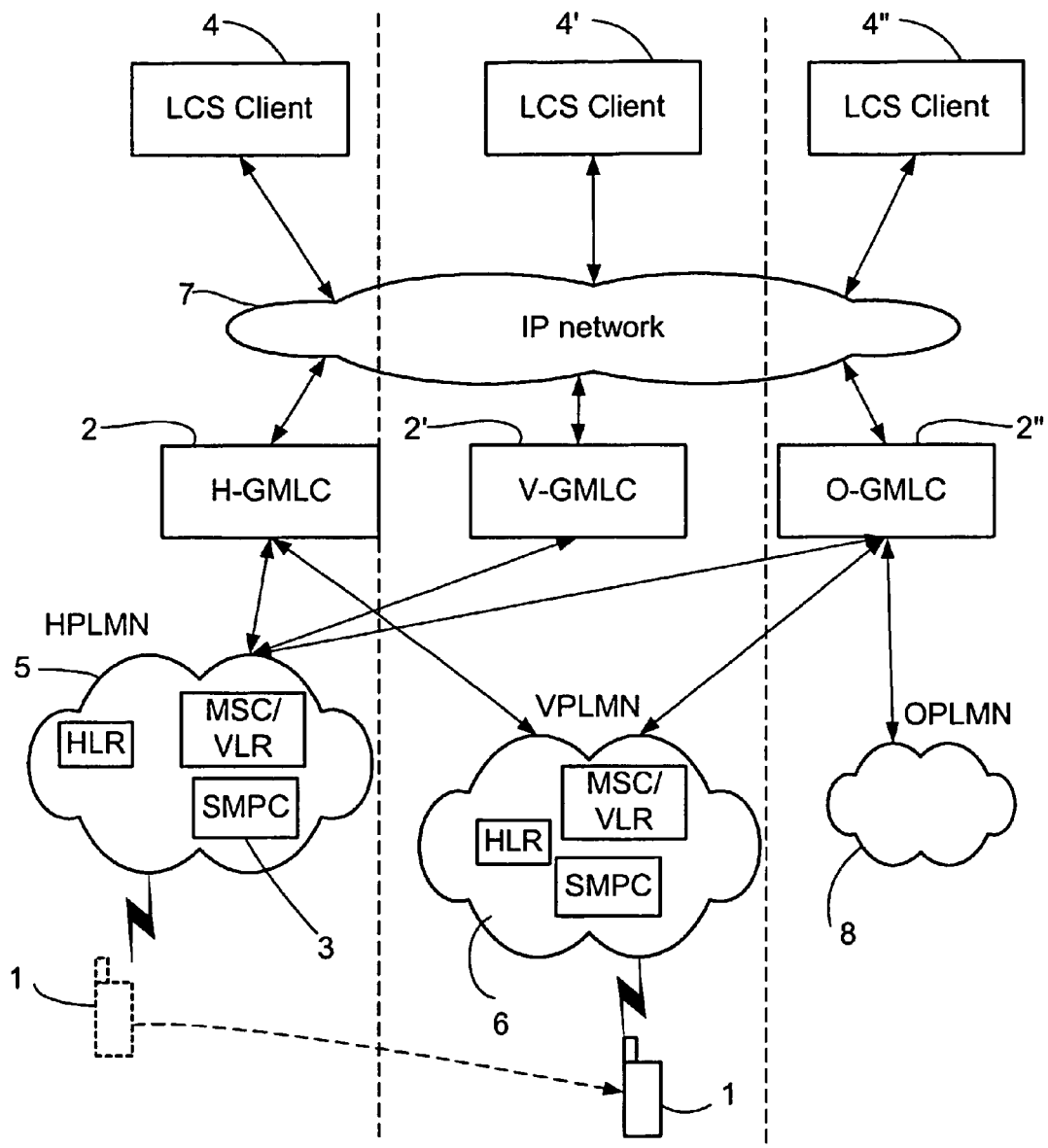
FIG. 1 illustrates a system according to the invention providing location service for positioning a mobile station, wherein an originating network and a current network uses different positioning mechanisms/protocols.

With reference now to the figures wherein like or similar elements are designated with identical reference numerals, there is a block diagram and a flowchart. This diagram is not necessarily intended to schematically represent particular modules of circuitry or any particular data or control paths. It should also be emphasised that the terms "comprises" and "comprising" when used in this specification is taken to specify the presence of stated features, integers, steps or components but does not preclude the presence or addition of one or more other features, integers, steps, components or groups thereof.

FIG. 1 illustrates one example embodiment of a communication network configuration for providing location services for positioning a subscriber with a portable radio communication apparatus or equipment such as a mobile telephone 1 when located in a current network 6, wherein a home network 5 and the current network 6 use different positioning mechanisms/protocols.

The term portable radio communication equipment, which herein after is referred to as a mobile radio terminal or mobile phone includes but is not limited to all equipment such as mobile telephones, pagers, communicators, electronic organizers, smart phones or the like.

The system configuration comprises a home Gateway Mobile Location Centre (H-GMLC) 2 and a Serving Mobile Location Centre (SMLC) 3. The GMLC is a vital part of a mobile positioning system. The GMLC is the Ericsson Gateway Mobile Positioning Centre (GMPC), which is Ericsson's implementation of, but is not limited to, the by ETSI standardised Gateway Mobile Location Centre (GMLC). In one embodiment, the GMLC 2 is a system that comprises at least a computer processor or other processing component and a data store operatively connected to the processing component.

The GMLC 2 is the GSM/UMTS PLMN node to be accessed by an external location services (LCS) client 4 when it requests the location of a certain mobile station. The GMLC 2 offers interfaces, XML/HTTP based in this embodiment, through which the LCS client 4, 4', 4" and the GMLC 2, 2', 2" can communicate, for example over an IP network 7, e.g. the Internet. The communication includes positioning requests from the LCS 4, 4', 4" client and positioning answers from the GMLC 2, 2', 2". Each GMLC 2, 2', 2" is adapted to handle connections from multiple LCS clients 4, and/or 4', and/or 4" simultaneously. Moreover, the GMLC 2 performs, among other things, an authorization check on the request.

The authorized request is delivered to the SMLC 3 via a PLMN 5, for example a GSM network. The SMLC 3 collects position information from the GSM network 5 and calculates the location, such as co-ordinates, to be used by the service or client 4. The location is delivered to the GMLC 2, which is adapted to receive the location and create a location response. This response is replied to the requesting LCS-C 4.

The GMLC 2 is adapted to provide support for LCS where position needs to be obtained for roaming terminals and/or terminals belonging to other PLMNs 6. The GMLC 2 has information to dynamically select a protocol, SS7 or IP-based in this example embodiment, to be used in the communication of positioning data with each specific PLMN 5,6. Thus, based on roaming capability information defined in the GMLC 2 for each HPLMN 5 and VPLMN 6, the GMLC 2 is adapted to select the proper protocol to be used when addressing the particular PLMN 5,6 with a positioning request or routing request.

The GMLC 2 is in this embodiment configured, but not limited, to select between different roaming protocols, for example SS7 based protocols, or IP based protocols such as the GMLC-centric IP roaming protocol or location middleware (LMw) centric IP roaming protocols. It should therefore be apparent to those skilled in the art that this technology is not limited to be employed in an GMLC but could also be located in for example a location middleware. Also, in one embodiment LMw is used as an interconnect layer between LCS clients and GMLCs. In a such embodiment, network to network communication may be performed between LMw nodes.

One SS7 protocol is defined in the LCS standards Stage 2 GSM TS 03.71, v 8.2.0 and GSM TS 29.002 which are enclosed herein by reference. One IP based roaming protocol is the MLP 3.0.0 developed by Location Interoperability Forum (LIF) which is enclosed herein by reference.

Figure 2:
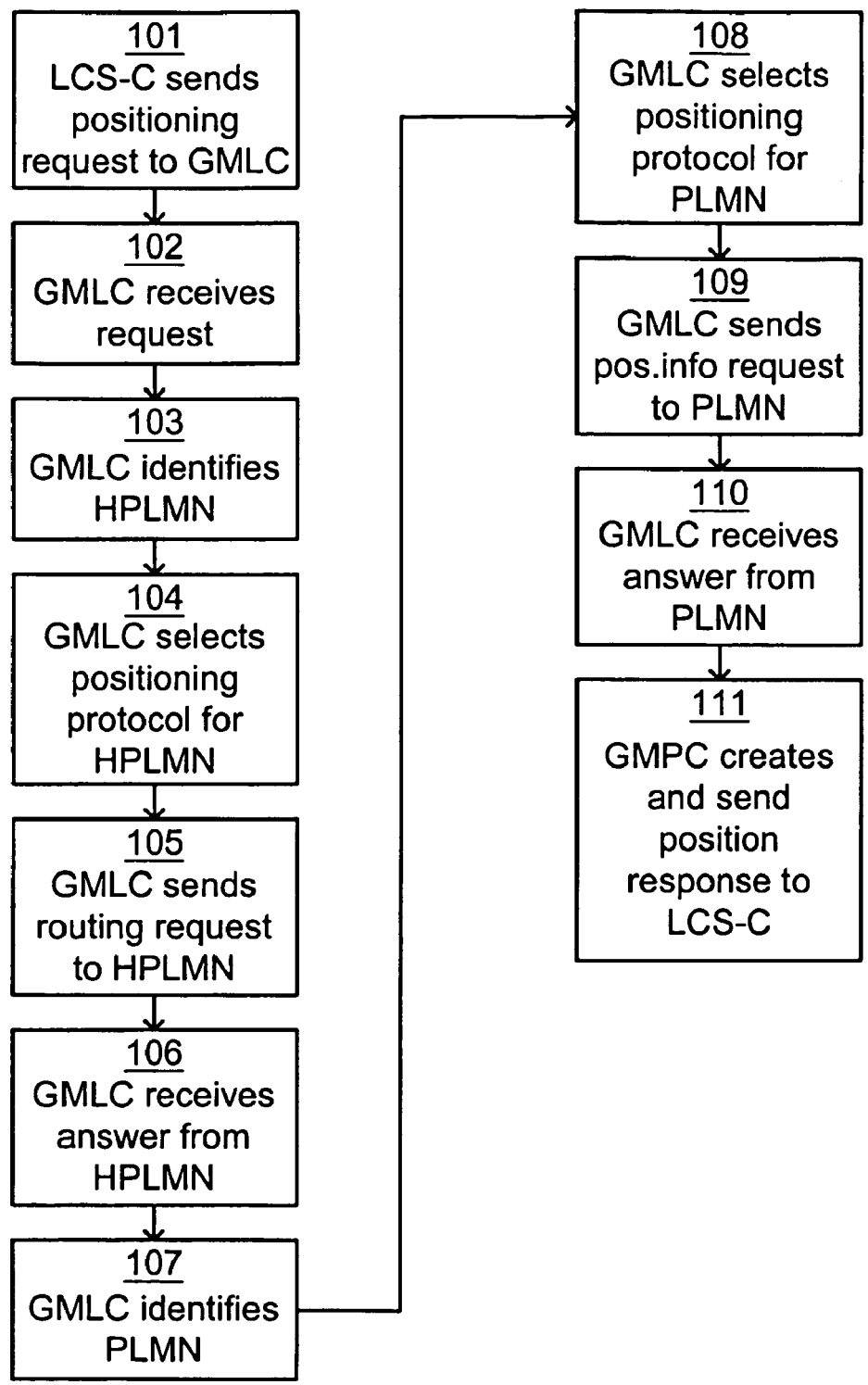
FIG. 2 is a flow chart illustrating the method of positioning a mobile station according to the invention.

A flow chart in FIG. 2 illustrates one example method of positioning a subscriber. In step 101 the LCS client 4 sends a positioning request to the GMLC 2. The GMLC receives the request in step 102, analyses and identifies the subscriber's home PLMN (HPLMN) 5 in an LCS signalling list in step 103. Said LCS signalling list comprises entries, each including a network identifier and a protocol. Based on the result from the identification and analysis in step 103, a suitable positioning protocol, for example SS7, is selected for communication with the home PLMN in step 104. A routing information request is sent to the home PLMN 5 in step 105 and an answer is received by the GMLC 2 from the PLMN 5 in step 106.

When the GMLC 2 has received the answer it analyses the parameter data and identifies the subscriber's current PLMN in the LCS signalling list in step 107. In this example the MS 1 is roaming in a visited PLMN 6. Based on the result from the identification and analysis in step 107, a suitable positioning protocol, for example an IP based protocol using the IP network 7, is selected for communication with the visited PLMN 6 in step 108. A position request is sent to the visited PLMN 6 in step 109 and an answer including co-ordinates and/or other location information about the roaming subscriber and its apparatus 1 is received by the GMLC 2 from the VPLMN 6 in step 110. Finally, the GMLC 2 creates a position response and replies it to the requesting LCS-C 4 in step 111.

The method, system and apparatus are not limited to positioning of roaming MSs, but are capable of positioning MSs in all cases involving positioning related communication between PLMNs. One example of a traffic case where such communication is needed is when an LCS client 4" using an originating GMLC (O-GMLC) 2" and needs to locate an MS which is a subscriber to another PLMN than an OPLMN (Originating PLMN) 8, independently on whether the MS is roaming outside its home PLMN or not. Another such traffic case occurs when an MS 1 is currently located in its home network HPLMN 5 or a visited network VPLMN 6 but accesses a location based service, using another LCS-C (4") associated with an originating GMLC (O-GMLC)(2").

In addition, the invention also extends to computer programs adapted for putting the invention into practice when executed on a computer. The program may be in the form of source code, object code a code suitable for use in the implementation of the method according to the invention. The program may be embodied for example in a record medium, computer memory, or read-only memory.

Although one example embodiment of the method, system and apparatus has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

The invention claimed is:

1. A method for obtaining the position of a mobile station located in a current visiting network of a communications system including a plurality of networks supporting different positioning protocols, comprising:
   receiving at a location center a positioning request for the mobile station;
   in response to the positioning request, the location center identifying a home network for the mobile station;
   based on said identified home network and roaming capability information for the home network, the location center dynamically selecting from among at least two positioning protocols including an SS7-based positioning protocol and an IP-based positioning protocol one of the two positioning protocols for communication with the home network of location information associated with the position of the mobile station;
   identifying at the location center the current visiting network of said mobile station;
   based on said identified current visiting network and roaming capability information for the current visiting network, the location center dynamically selecting from among the at least two positioning protocols one of the two positioning protocols for communication with said current visiting network of location information associated with the position of the mobile station;
   sending a positioning request to the current visiting network using the other positioning protocol; and
   receiving positioning information about the mobile station from the current visiting network using the other positioning protocol.

2. A method according to claim 1, where before identifying the current visiting network of the mobile station, the method further comprises:
   after selecting the one positioning protocol for communication with said home network, sending a routing information request to the home network,
   receiving an answer from the home network, and
   analyzing the answer for identifying the current visiting network of the mobile station.

3. A method according to claim 1, further comprising:
   sending a position information request to the current visiting network, and receiving an answer including location information about the subscriber from the current visiting network.

4. A method according to claim 1, wherein the IP-based protocol includes an MLP or IP roaming protocol.

5. A computer program embodied in a computer readable medium, comprising program instructions which when executed cause a computer to perform the method of claim 1.

6. A computer program stored in a record medium, computer memory, or read-only memory and comprising computer executable instructions which when executed cause a computer to perform the method according to claim 1.

7. Apparatus for obtaining the position of a mobile station located in a current visiting network of a communications system including a plurality of networks supporting different positioning protocols, comprising:
   a processing component configured to:
      in response to a positioning request for the mobile station, identifying a home network for the mobile station;
      based on said identified home network and roaming capability information for the home network, dynamically select from among at least two positioning protocols including an SS7-based positioning protocol and an IP-based positioning protocol one of the two positioning protocols for communication with the home network of location information associated with the position of the mobile station;
      identify the current visiting network of the mobile station;
      based on said identified current visiting network and roaming capability information for the current visiting network, dynamically select from among at least two positioning protocols one of the two positioning protocols for communication with said current visiting network of location information associated with the position of the mobile station;
      send a positioning request to the current visiting network using the other positioning protocol; and
      receive positioning information about the mobile station from the current visiting network using the other positioning protocol.

8. Apparatus according to claim 7, further comprising:
   a receiving component and a sending component, wherein said receiving component is configured to receive a positioning request from an location services client,
   said sending component is configured to send a routing information request to the home network,
   said receiving component is configured to receive an answer from the home network, and
   said processing component is configured to analyze the answer for identifying the current visiting network of the mobile station.

9. Apparatus according to claim 7, wherein said sending component is configured to send a routing information request to the visited network, and
   said receiving component is configured to receive an answer including location information about the roaming subscriber from the visited network.

10. Apparatus according to claim 7, wherein the IP-based protocol is an GMLC-centric IP roaming protocol or a location middleware IP roaming protocol.

* * * * *